AUTOMATIC TUNING SYSTEM FOR A SUPERHETERODYNE RECEIVER

Filed April 5, 1968

United States Patent Office 3,564,422

Patented Feb. 16, 1971

3,564,422

AUTOMATIC TUNING SYSTEM FOR A SUPERHETERODYNE RECEIVER

Joel Julie, Bronxville, and Edward J. Roth, Old Bethpage, N.Y., and Jonas M. Shapiro, Stamford, Conn., assignors to Litton Systems, Inc., Beverly Hills, Calif.

Filed Apr. 5, 1968, Ser. No. 719,101
Int. Cl. H04b *1/06, 1/32*
U.S. Cl. 325—389 7 Claims

ABSTRACT OF THE DISCLOSURE

An automatic tuning system for a superheterodyne receiver comprising a tunable preselector stage, servo drive means for adjusting the tuning of the preselector stage, and an amplifier connected by switches to said preselector stage to form an oscillatory circuit in combination therewith whose frequency is substantially the same as that of the preselector stage. The tuning adjustment is swept over a predetermined range by the servo drive means to provide a receiver output signal. The output signal is monitored for controlling said servo drive means by terminating the sweep when the output signal reaches the tuned frequency desired.

BRIEF SUMMARY OF THE INVENTION

The present invention relates to an automatic tuning system for a radio receiver; and, more particularly, to an automatic system capable of tuning a superheterodyne receiver continuously over a full spectrum of receiver frequencies.

All radio receivers except a few designed to meet specialized needs are of the superheterodyne type. These receivers include a radio-frequency section, a mixer (or first detector) and local oscillator, an intermediate-frequency amplifier, and an indicating device such as a loudspeaker.

The radio-frequency section provides coupling from the antenna input terminals of the receiver to the first mixer. The chief purposes of the radio-frequency section are to provide an efficient coupling between the antenna and first mixer for effectively utilizing the energy abstracted from the radio waves, and to provide discrimination or selectivity against image and intermediate-frequency signals. Selectivity obtained in this way is commonly termed preselection because it preceds the mixer.

In the present invention, the natural resonance of the preselector stage of the radio receiver, which may consist of a single or a plurality of tuned circuits, is utilized in conjunction with an external amplifier to form an oscillatory circuit therewith whose frequency is substantially the same as that of the preselector. The receiver is conditioned to receive the desired channel by setting the local oscillator to the proper frequency. The preselector is then disconnected from the antenna and switched over to the amplifier to form the oscillator or signal generator. The signal that is generated is applied to the receiver input in lieu of the antenna signal and the receiver output is monitored for response to this signal. Servo drive means is coupled to the preselector tuning mechanism, said servo drive being controlled by the signal derived from the receiver output as the drive sweeps the preselector through its tuning range. When an output response is detected in the receiver, the preselector is tuned to the desired channel; and the servo drive is stopped. The preselector is switched then over to the antenna to automatically establish the normal receiving mode.

DETAILED DESCRIPTION OF PREFERRED EMBODIMENT

Figures 1, 2:
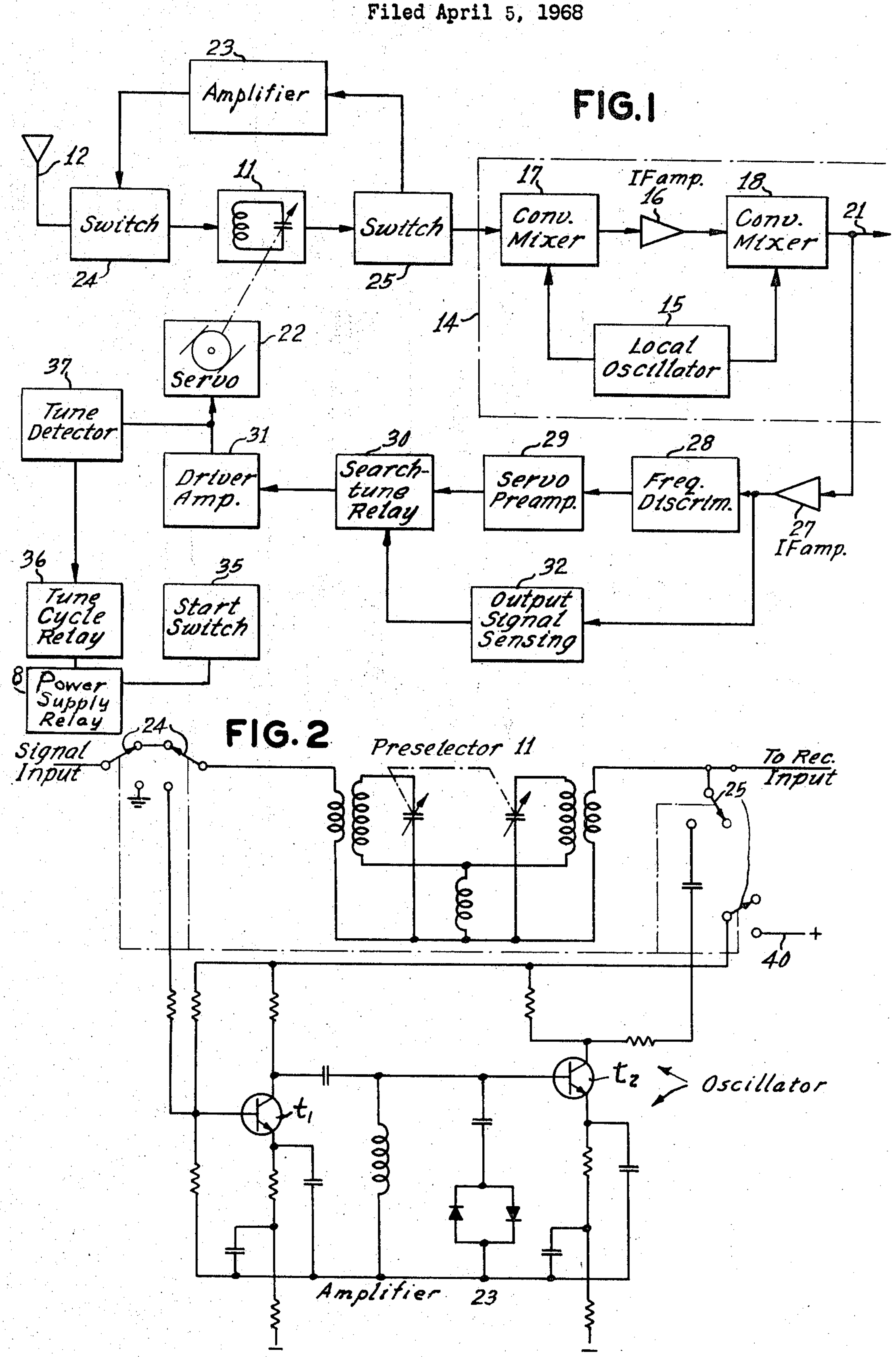
FIG. 1 is a block diagram of the receiver tuning system.
FIG. 2 illustrates the preselector-oscillator circuit of FIG. 1 in detail.

Referring now to the drawing, particularly FIG. 1, the automatic tuning system for a superheterodyne receiver comprises one or more tuned circuits within a preselector 11 connected between a receiving antenna 12 and the remainder of the superheterodyne receiver 14. As shown, the superheterodyne receiver 14 may comprise a conventional local oscillator 15, IF amplifier 16, an up converter mixer 17 and down converter mixer 18. The output of the receiver down converter 18 is connected through conductor 21 to the amplifying stages of the receiver (not shown).

The tuning of the preselector 11 is effected by means such as a servo-motor 22 connected to the variable tuning elements of the preselector stage 11, as indicated. Means are also provided for detecting or gaging the frequency to which the preselector 11 is tuned as the servomotor 22 sweeps it through the frequency range. These means include an amplifier 23 connected therewith to form an oscillating circuit 23 capable of generating an output frequency. As shown, switches 24 and 25 may be provided to disconnect the antenna 12 from the preselector 11 and simultaneously connect the amplifier 23 to the preselector 11 to provide an oscillator, the output frequency of which is determined by the tuning adjustment of the preselector 11. When the desired tuning adjustment is reached, which in turn is determined by the setting of the local oscillator 15 to the desired frequency corresponding to the selected channel, a signal appears in the output circuit of the down-converter which signal is utilized to precisely guide and eventually stop the servomotor 22 and switch the preselector 11 over to the normal receiving mode. As shown by way of example, the signal in the output conductor 21 is amplified by IF amplifier 27 and impressed upon a frequency discriminator 28, a servo preamplifier 29, and the search-tune relay 30 which selects the operating mode of the driver amplifier 31 connected to the servomotor 22.

A signal-sensing device 32 is responsive to the occurrence of an output signal in conductor 21 to switch relay 30 from its normal search mode, where it connects the signal-sensing device 32 to the drive amplifier 31, to the tune mode, where it instead connects the servo-preamplifier 29 to the drive amplifier 31. Start switch 35 is used to initiate a search mode and tune cycle by latching power relay 38 in that mode by relay 36. Tune detector 37 is used to unlatch relay 36 when the tune cycle is completed.

The preselector stage 11 may include one or more tunable circuits constituting a composite band-pass filter between the antenna input circuit and the radio receiver input. As shown in FIG. 2, switches 24 and 25 are provided to control the connection of preselector 11 to the antenna 12 or to amplifier 23, the switch 25 being arranged to also connect the power supply lead 40 to the amplifier when it is operative. The amplifier 23 may be constructed in various ways. A preferred arrangement as shown in FIG. 2 comprises a two-stage amplifier $t_1$ and $t_2$. The amplifier circuit becomes an oscillator when the preselector is switched over to provide a positive feedback path from the output of transistor amplifier $t_2$ to the input of amplifier $t_1$ via the preselector. The oscillation frequency is the same as or substantially the same as the frequency to which the preselector filter is tuned. Any conventional filter may be employed since the complexity of the filter has no direct bearing on its ability to function as a feedback link in the oscillatory circuit. All that is required for oscillations to occur is that the amplifier has sufficient gain to overcome the loss of the filter and that the feedback signal is in phase with that of the amplifier input. Obviously, an amplifier-filter combination can always be arranged in such a manner as to satisfy both of these conditions for generating oscillations. Furthermore, when the conditions for oscillation have been established for the precise tuning of the filter, the amplifier-filter combination can only oscillate at the frequency to which the filter is tuned.

The servomotor 22 can be controlled in any desired manner in response to the output signal in the conductor 21 to effect automatic tuning of the receiver. An accurate and reliable system is shown in the drawing by way of example. The operation is as follows: When a new receive channel is selected by resetting the local oscillator 15, the momentary start switch 35 is closed, which energizes the power supply relay 38 which in turn supplies power to energize the entire automatic tuning system. A tuning cycle latch relay 36 is provided to maintain relay 38 energized for the duration of the tuning cycle. The switches 24 and 25 are actuated by the operation of relay 38 to convert the preselector 11 into an oscillatory circuit as described above, by connecting amplifier 23 thereto while disconnecting the antenna 12 therefrom. At the same time driver amplifier 31 is energized and the servomotor 22 connected thereto rotates unidirectionally at constant speed. During the period of incorrect preselector tuning, there is no signal on the conductor 21 and relay 30 remains in the search mode. When a signal appears on conductor 21, indicating the approach of a tune condition, the sensing device 32 switches relay 30 into the tune mode and the driver amplifier 31 is now under the control of the voltage of discriminator 28 as amplified by the preamplifier 29. As the preselector 11 approaches the precise tuning adjustment, the output voltage of the discriminator 28 decreases to slow down the servomotor to prevent "overshoot" of the tuning adjustment. As precise tuning is achieved, the output voltage of amplifier 31 drops to zero or a low value to activate the tune detector 37 to release relay 36. Relay 36 in turn deenergizes relay 38 to disconnect power from the switches 24 and 25 and the amplifier 23 thus disabling the oscillator formed by the amplifier 23 and the preselector 11 and reconnecting the antenna 12 to the preselector 11 for establishing the normal receiving mode.

It will be apparent that the invention enables rapid and exact tuning of a superheterodyne receiver, and is particularly adapted for remote control in a system incorporating a relatively large number of channels. The tuning system may be applied to a superheterodyne receiver by the addition of but a few additional components or circuits, and has the advantage of automating the inherent selectivity thereof. While a specific embodiment of the invention has been described in detail for the purpose of explaining the underlying principles thereof, various modifications will be apparent to those skilled in the art and may be made without departing from the spirit and scope of the invention.

What is claimed is:

1. In apparatus for tuning a preselector stage connected between an antenna and a radio receiver, the combination comprising:

a servo drive system connected to said preselector stage for varying the tuning of said preselector stage;

an amplifier;

switching means for connecting said amplifier to said preselector stage and disconnecting said antenna therefrom to form an oscillatory circuit with said amplifier whose frequency is subtsantially the same as that of the preselector stage;

local oscillator means for generating a desired frequency signal;

means responsive to the frequency signal of said oscillatory circuit and the frequency signal of said local oscillator for operating said servo drive system and varying the tuning of said preselector stage until said frequency signals are substantially equal, said responsive means thus terminating said servo drive system operation and operating said switching means to disconnect said amplifier from said preselector stage and connect said antenna thereto.

2. Tuning apparatus according to claim 1, in which the radio receiver is a superheterodyne receiver.

3. Apparatus for automatically tuning a preselector stage connected between an antenna and a superheterodyne receiver having a local oscillator therein, comprising:

amplifying means;

switching means for connecting said amplifying means to said preselector stage instead of said antenna thus forming an oscillatory circuit whose frequency is substantially the same as that of the preselector stage;

means for receiving and detecting frequency signals from said oscillatory circuit thus formed and from said local oscillator whose generated frequency the preselector stage is to be automatically tuned to match;

means for adjusting the frequency of said oscillatory circuit thus formed;

said means for receiving and detecting frequency signals from said oscillatory circuit and from said local oscillator connected to said means for adjusting said oscillatory circuit for terminating said adjustment when said frequency signals are subtsantially equal and further connected to said switching means for reconnecting said preselector stage to said antenna when said frequency signals are substantially equal.

4. Apparatus for automatically tuning a preselector stage of a superheterodyne receiver as claimed in claim 3, wherein said means for receiving and detecting frequency signals from said oscillatory circuit and from said local oscillator include:

first mixer means, intermediate frequency amplifying means, and second mixer means serially connected to said preselector stage having said local oscillator connected to said first and second mixer means for generating an output signal as said adjustment of the frequency from said oscillatory circuit approaches the frequency setting of said local oscillator;

means receiving said output signal from said second mixer means including search mode and tune cycle means for providing search and tune control signals to said means for adjusting the frequency of said oscillatory circuit.

5. Apparatus for automatically tuning a preselector stage of a superheterodyne receiver as claimed in claim 4, wherein said means receiving said output signal including search mode and tune cycle means further comprise:

a second intermediate frequency amplifier connected to receive said output signal from said second mixer means;

search-tune selection means connected to said means for adjusting the frequency of said oscillatory circuit for normally retaining said means for adjusting in said search mode;

output signal sensing means connected between said second intermediate frequency amplifier and said search-tune selection means for switching said means to said tune cycle when said output signal is generated;

frequency discriminator means connected in parallel between said second intermediate frequency amplifier and said search-tune selection means for applying a decreasing signal to said means for adjusting the frequency of said oscillatory circuit for terminating said adjustment thereof as said oscillatory circuit frequency signal and said local oscillator frequency signal become substantially equal.

6. Apparatus for automatically tuning a preselector stage of a superheterodyne receiver as claimed in claim 4, wherein said means for adjusting the frequency of said oscillatory circuit includes:

driver amplifier means connected for receiving said search and tune control signals;

servo motor means driven by said driver amplifier means and driving said preselector stage for adjusting the frequency of said oscillatory circuit formed by said preselector stage and amplifying means.

7. Apparatus for automatically tuning a preselector stage of a superheterodyne receiver as claimed in claim 6, additionally comprising:

tune detector means connected to said driver amplifier means for sensing the reduction of a signal therefrom and thereby generating a stop signal;

switching means connected to said detector means for terminating said adjustment of said servo motor means and switching said first mentioned switch means to connect said antenna to said preselector stage and disconnect said amplifying means therefrom.

References Cited

UNITED STATES PATENTS

| | | | |
|---|---|---|---|
| 2,766,384 | 10/1956 | Prewitt | 334—27 |
| 2,885,546 | 5/1959 | Taylor et al. | 325—471 |
| 2,930,993 | 3/1960 | Galletti | 331—59 |
| 3,228,235 | 1/1966 | Thomas | 331—59 |

ROBERT L. GRIFFIN, Primary Examiner

A. J. MAYER, Assistant Examiner

U.S. Cl. X.R.

325—471; 331—59; 334—18, 20, 21